United States Patent
Lee et al.

(10) Patent No.: US 10,013,618 B2
(45) Date of Patent: Jul. 3, 2018

(54) METHOD AND APPARATUS FOR DETECTING SIDE OF OBJECT USING GROUND BOUNDARY INFORMATION OF OBSTACLE

(71) Applicant: HYUNDAI MOTOR COMPANY, Seoul (KR)

(72) Inventors: Jae Hong Lee, Incheon (KR); Sung Won Yoon, Yongin-si (KR); Yong Cheon Na, Seoul (KR); Goo Do Kwon, Anyang-si (KR); Dong Ha Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 15/280,251

(22) Filed: Sep. 29, 2016

(65) Prior Publication Data

US 2017/0357860 A1   Dec. 14, 2017

(30) Foreign Application Priority Data

Jun. 9, 2016 (KR) ........................ 10-2016-0071688

(51) Int. Cl.
*G06K 9/00* (2006.01)
*G06K 9/46* (2006.01)
*G06K 9/32* (2006.01)

(52) U.S. Cl.
CPC ....... *G06K 9/00805* (2013.01); *G06K 9/3233* (2013.01); *G06K 9/4604* (2013.01)

(58) Field of Classification Search
CPC . G06K 9/00805; G06K 9/3233; G06K 9/4604
See application file for complete search history.

(56) References Cited

U.S. PATENT DOCUMENTS

| | | | |
|---|---|---|---|
| 2011/0311108 A1 | 12/2011 | Badino et al. | |
| 2015/0329049 A1* | 11/2015 | Kanou | G06K 9/4604 348/148 |

FOREIGN PATENT DOCUMENTS

| | | | | |
|---|---|---|---|---|
| JP | 2011-113340 A | 6/2011 | | |
| JP | 2015-225546 A | 12/2015 | | |
| JP | 2015225546 A | * 12/2015 | ............ | B60R 21/00 |
| KR | 10-2012-0086577 A | 8/2012 | | |
| KR | 10-1472787 B1 | 12/2014 | | |
| KR | 10-2016-0063039 A | 6/2016 | | |

* cited by examiner

*Primary Examiner* — Ping Hsieh (74) *Attorney, Agent, or Firm* — McDermott Will & Emery LLP (57) ABSTRACT

A method for detecting a side of an object in an apparatus for detecting a side of an object within an image includes analyzing, by a boundary line detector, an input image to search a detection target region in which a target object is included, detecting, by the boundary line detector, a boundary line between the target object and a ground within the detection target region, calculating, by a side determiner, a gradient for the boundary line, and analyzing, by the side determiner, an image within the detection target region on the basis of the gradient to determine that the entirety of the detection target region is a region of the side of the target object or to determine a separated region corresponding to the side of the target object in the detection target region.

14 Claims, 9 Drawing Sheets

METHOD AND APPARATUS FOR DETECTING SIDE OF OBJECT USING GROUND BOUNDARY INFORMATION OF OBSTACLE

CROSS-REFERENCE TO RELATED APPLICATION

This application claims the benefit of priority to Korean Patent Application No. 10-2016-0071688, filed on Jun. 9, 2016 with the Korean Intellectual Property Office, the disclosure of which is incorporated herein in its entirety by reference.

TECHNICAL FIELD

The present disclosure relates to a method and an apparatus for detecting a side of an object, and more particularly, to a method and an apparatus for detecting a side of an object capable of detecting information on a side of an object using ground boundary information of an obstacle obtained utilizing characteristics of a three-dimensional (3D) object projected on a two-dimensional (2D) plane.

BACKGROUND

In a method for detecting an object using a monocular camera according to the related art, a vehicle, or the like, may be detected using a two-dimensional (2D) rectangular image obtained by photographing a rear of an object from a vehicle. Another, or an additional, device such as multiple classifiers, and the like, should be configured after additional learning in order to detect a side of a front object, which may be difficult.

In addition, in another method for detecting an object according to the related art for detecting a side, there have been attempts to implement a target object in a clustering scheme using an optical flow of the target object detected using 6D-vision, but there was an overhead that complicated calculations such as a motion vector, or the like, should be performed in order to calculate a model of the target object.

SUMMARY

The present disclosure has been made to solve the above-mentioned problems occurring in the prior art while advantages achieved by the prior art are maintained intact.

An aspect of the present disclosure provides a method and an apparatus for detecting a side of an object capable of increasing accuracy in detecting the object by separation between a side and a rear of the object and improving efficiency by a small amount of calculation by analyzing a ground boundary pattern of a detected obstacle and detecting information on the side, utilizing characteristics of a three-dimensional (3D) object projected on a two-dimensional (2D) plane without using other additional devices.

According to an exemplary embodiment of the present disclosure, a method for detecting a side of an object in an apparatus for detecting a side of an object within an image includes: analyzing, by a boundary line detector, an input image to search a detection target region in which a target object is included and detecting, by the boundary line detector, a boundary line between the corresponding target object and a ground within the detection target region; and calculating, by a side determiner, a gradient for the boundary line and analyzing, by the side determiner, an image within the detection target region on the basis of the gradient to determine that the entirety of the detection target region is a region for the side of the target object or determine a separated region corresponding to the side of the target object in the detection target region.

The method for detecting a side of an object may be for detecting the side of the target object having an influence on driving of a vehicle during the driving of the vehicle through the apparatus within the vehicle.

When the gradient is larger than a first threshold and a distance at a point from which the distance to an approximated straight line is largest among points on the boundary line is smaller than a second threshold, it may be determined that the entirety of the detection target region is the region for the side.

The second threshold may be a value preset in order to determine whether or not the side and a rear of the target objects are distinguished from each other.

The method for detecting a side of an object may further include: deciding whether or not signs of distances from points on the boundary line to an approximated straight line are the same as each other in order to determine the separated region corresponding to the side of the target object; separating the detection target region into left and right regions on the basis of a point from which the distance to the approximated straight line is largest among points on the boundary line when all of the signs are the same as each other; and comparing gradients of the respective boundary lines between the corresponding target object and the ground with each other within the respective separated regions in which the detection target is separated and determining that a region having a larger gradient is the separated region corresponding to the side of the target object in the detection target region.

The method for detecting a side of an object may further include, after the comparing, determining that a region having a smaller gradient is a separated region corresponding to a rear of the target object.

The method for detecting a side of an object may further include combining images of detection target regions determined to be the region for the side of the target object with each other so that the detection target regions are put on a continuous plane of the same object.

Gradients of corresponding boundary lines within the detection target regions determined to be the region for the side of the target object may be compared with each other, and it may be decided that the detection target regions belong to the continuous plane of the same object to combine the images of the detection target regions with each other, when a gradient difference is smaller than a predetermined threshold.

According to another exemplary embodiment of the present disclosure, an apparatus for detecting a side of an object within an image includes: a boundary line detector analyzing an input image to search a detection target region in which a target object is included and detecting a boundary line between the corresponding target object and a ground within the detection target region; and a side determiner calculating a gradient for the boundary line and analyzing an image within the detection target region on the basis of the gradient to determine that the entirety of the detection target region is a region for the side of the target object or determine a separated region corresponding to the side of the target object in the detection target region.

The apparatus for detecting a side of an object may be for detecting the side of the target object having an influence on driving of a vehicle during the driving of the vehicle through the apparatus within the vehicle.

The side determiner may determine that the entirety of the detection target region is the region for the side when the gradient is larger than a first threshold and a distance at a point from which the distance to an approximated straight line is largest among points on the boundary line is smaller than a second threshold.

The second threshold may be a value preset in order to determine whether or not the side and a rear of the target objects are distinguished from each other.

The side determiner may decide whether or not signs of distances from points on the boundary line to an approximated straight line are the same as each other in order to determine the separated region corresponding to the side of the target object, separate the detection target region into left and right regions on the basis of a point from which the distance to the approximated straight line is largest among points on the boundary line when all of the signs are the same as each other, and compare gradients of the respective boundary lines between the corresponding target object and the ground with each other within the respective separated regions in which the detection target is separated and determine that a region having a larger gradient is the separated region corresponding to the side of the target object in the detection target region.

The side determiner may determine that a region having a smaller gradient is a separated region corresponding to a rear of the target object after comparing the gradients with each other.

The apparatus for detecting a side of an object may further include a side combiner combining images of detection target regions determined to be the region for the side of the target object with each other so that the detection target regions are put on a continuous plane of the same object.

The side combiner may compare gradients of corresponding boundary lines within the detection target regions determined to be the region for the side of the target object with each other, and decide that the detection target regions belong to the continuous plane of the same object to combine the images of the detection target regions with each other, when a gradient difference is smaller than a predetermined threshold.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, the present disclosure will be described in detail with reference to the accompanying drawings. Here, and throughout the accompanying drawings, the same components will be denoted by the same reference numerals. In addition, a detailed description for functions and/or configurations that are well-known will be omitted. In the following specification, portions required for understanding operations according to various exemplary embodiments will be described, and a description for components that may obscure the concepts of the present disclosure will be omitted. In addition, some components in the accompanying drawings may be exaggerated, omitted, or schematically shown. Sizes of the respective components may not reflect actual sizes of the respective components. Therefore, contents mentioned herein are not limited by relative sizes of or intervals between components shown in the accompanying drawings.

Figure 1:
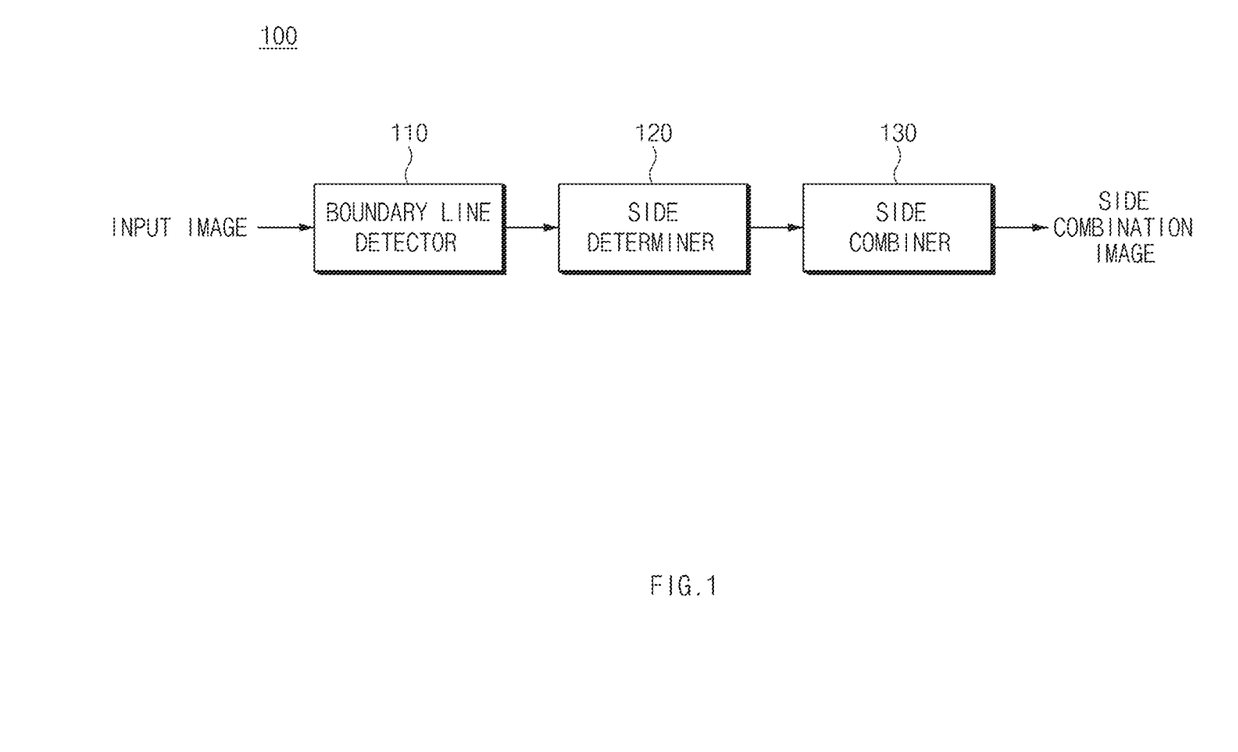
FIG. 1 is a view for describing an apparatus for detecting an object according to an exemplary embodiment of the present disclosure.

FIG. 1 is a view for describing an apparatus 100 for detecting an object according to an exemplary embodiment of the present disclosure.

Referring to FIG. 1, the apparatus 100 for detecting an object according to an exemplary embodiment of the present disclosure includes a boundary line detector 110, a side determiner 120 and a side combiner 130. The respective components of the apparatus 100 for detecting an object according to an exemplary embodiment of the present disclosure may be implemented by hardware such as a semiconductor processor, software such as an application program or a combination thereof. The apparatus 100 for detecting an object may be mounted in a vehicle, and may detect sides of various target objects having an influence on driving of the vehicle during driving of the vehicle.

First, components of the apparatus 100 for detecting an object according to an exemplary embodiment of the present disclosure for detecting a side of an object within an image will be briefly described.

The boundary line detector 110 may analyze an input image to search a box region (a detection target region in which a side is to be detected) in which a target object is included, and may detect a boundary line between the corresponding target object and a ground within the corresponding box region. Hereinafter, the detection target region will be described as the box region for convenience. However, the detection target region according to the present disclosure is a region that may be displayed or analyzed in a shape other than a box shape.

The side determiner 120 may calculate a gradient for the boundary line between the corresponding target object and the ground, and may analyze an image within the box region on the basis of the gradient to determine that the entirety of the box region is a region for the side of the target object or determine separated regions corresponding to the side of the target object in the box region.

The side combiner 130 may combine images of corresponding boxes with each other so that box regions determined to be regions for the side of the target object are located on a continuous plane of the same object.

Hereinafter, operations of the apparatus 100 for detecting an object according to an exemplary embodiment of the present disclosure will be described in more detail with reference to the flowchart of FIG. 2.

Figure 2:
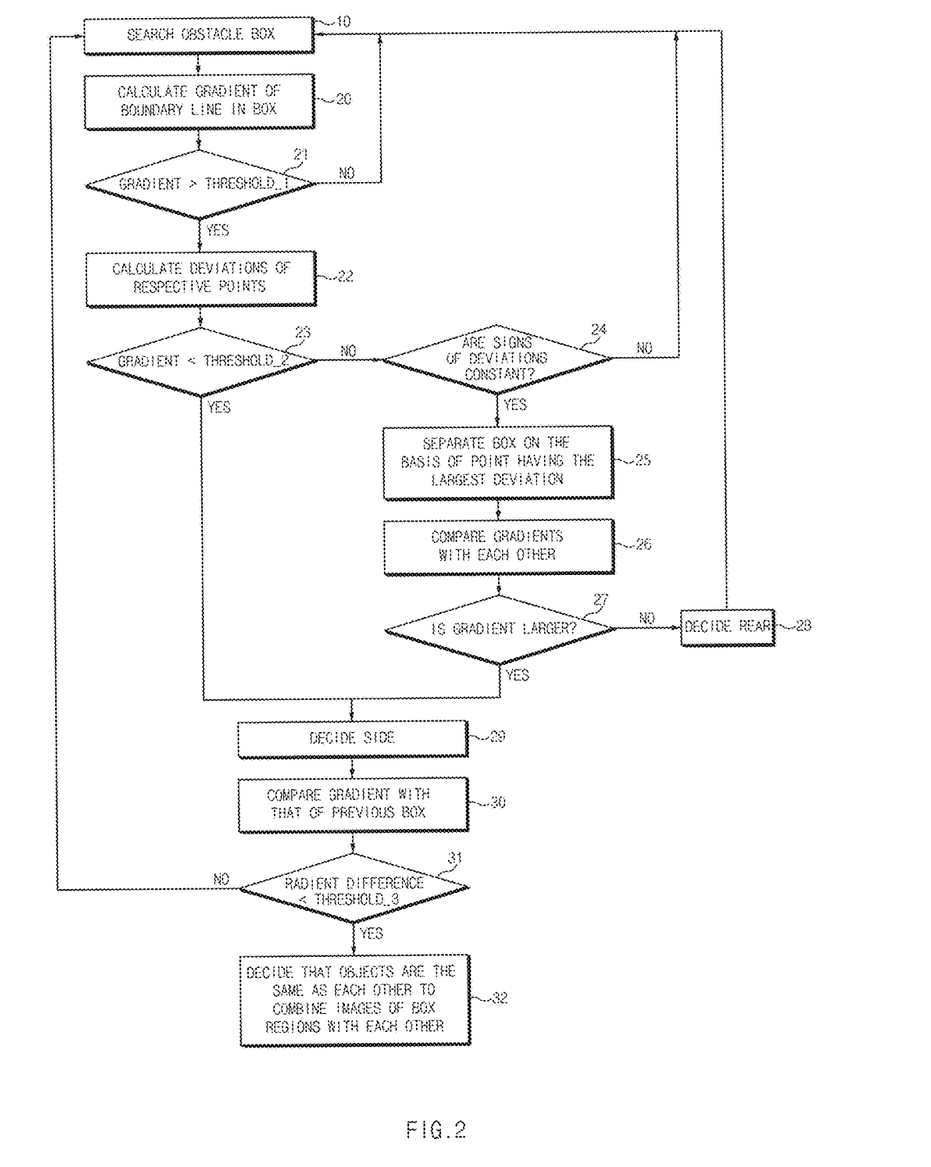
FIG. 2 is a flow chart for describing operations of an apparatus for detecting an object according to an exemplary embodiment of the present disclosure.

FIG. 2 is a flowchart for describing operations of the apparatus 100 for detecting an object according to an exemplary embodiment of the present disclosure.

Figure 3A:
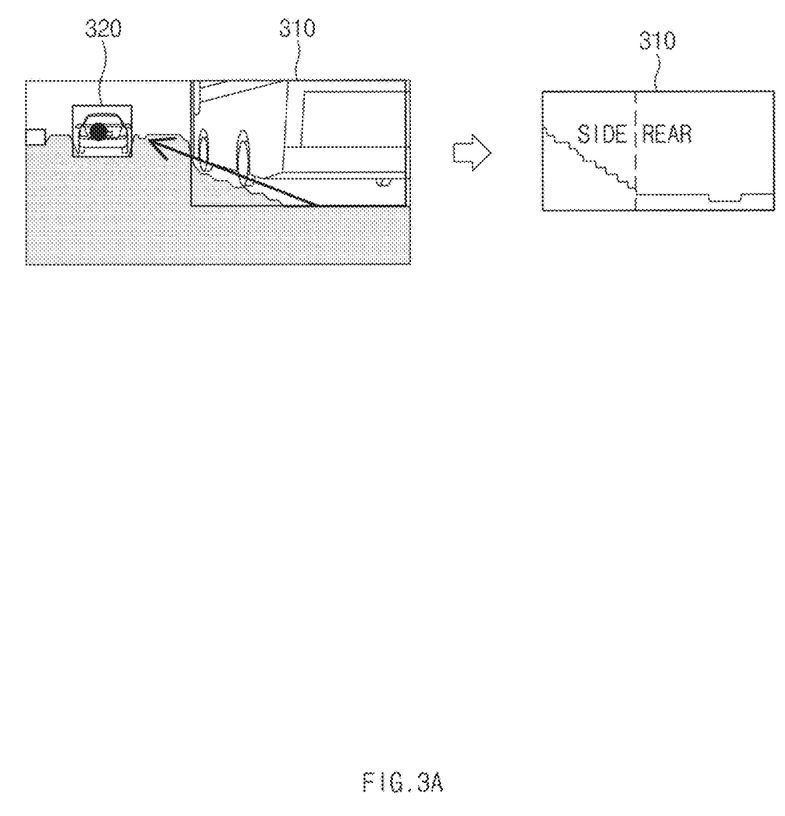
FIGS. 3A and 3B are views illustrating examples for describing a method for detecting a boundary line between an obstacle and a ground according to embodiments of the present disclosure.
Figure 3B:
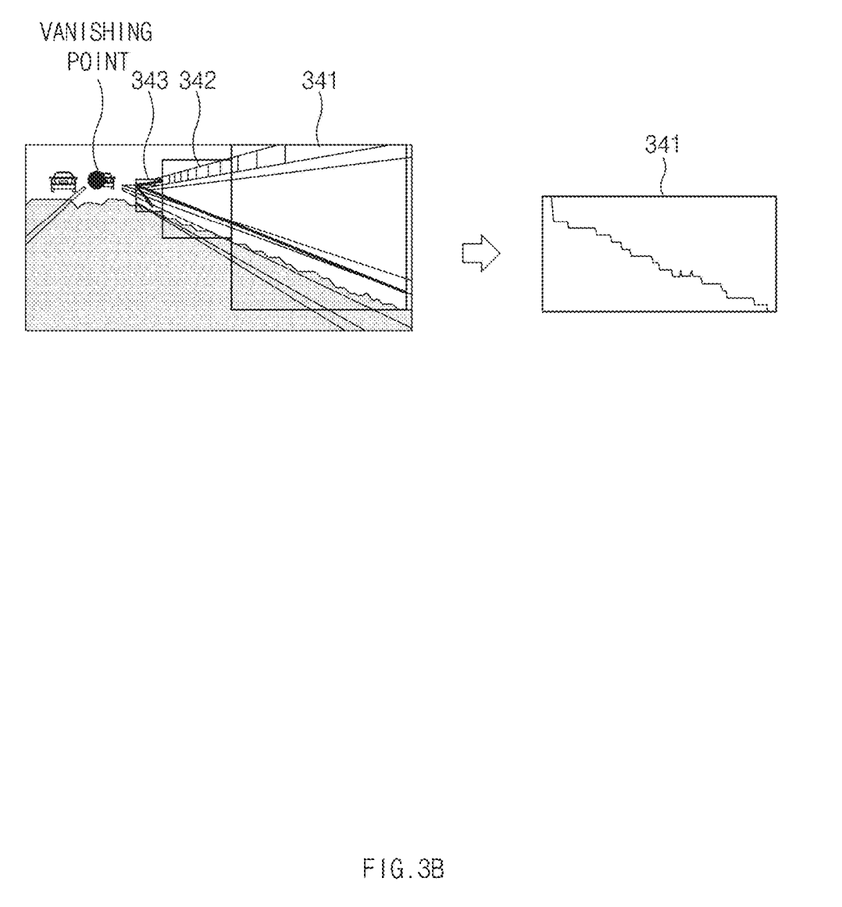

Referring to FIG. 2, first, the boundary line detector 110 may analyze an input image obtained using a digital camera (for example, a stereo camera, or the like) of a vehicle, or the like, during driving of the vehicle to search a box region in which a target object (or an obstacle) is included, and may detect a boundary line between the corresponding object and a ground within the box region (10). The boundary line detector 110 may detect a box region (for example, a rectangle) in which various target objects (except for an object of which a side does not need to be detected, such as a milepost, a road sign, or the like) having an influence on the driving of the vehicle, such as front vehicles, a guardrail, a retaining wall, a speed bump, a rock, a sinkhole, and the like, as illustrated by reference numerals 310 and 320 of FIG. 3A. Such a detection may be accomplished by an analysis such as extraction of a feature point for an image, or the like, and a detection of a boundary line (for example, a boundary line in which a vertical wall and the ground meet each other, a boundary line in which an extended line of a rear/a side of the vehicle and the ground meet each other, or the like) between the corresponding object (or an obstacle) and the ground on the basis of a brightness difference, a color difference, and the like, between pixels within the box region. Other data such as other patents by the present applicant will be referred to with respect to a more detailed method for detecting an object or a boundary line as described above. As illustrated in FIGS. 3A and 3B, a detected boundary line between an obstacle and a ground may show different aspects at a side and a rear. That is, a region shown as a side of an object (or an obstacle) may be extended toward a vanishing point (see a side of 310 of FIG. 3A and see FIG. 3B), similar to a lane, when a boundary is approximated as a straight line. In addition, in a case in which an object such as a guardrail, a retaining wall, or the like, is continued at a predetermined length or more, as illustrated in FIG. 3B, the box region may be separated into several regions (for example, 341, 342 and 343) so that a region occupied by the object within the corresponding box region is larger than other regions (for example, 50% or more) and is then detected.

Next, the side determiner 120 may determine a side of the detected object. Hereinafter, a case of determining the side of the object is divided into two cases. That is, in the case in which the entirety of the box region consists of only the side, it may be determined that the entirety of the corresponding box region is the side depending on a decision depending on steps 21 and 23 of the flowchart of FIG. 2, and in the case in which the rear other than the side is separated and detected from the box region, the side may be separated from the corresponding box region depending on decisions of steps 21, 23, 24 and 27 of the flowchart of FIG. 2.

Figure 4:
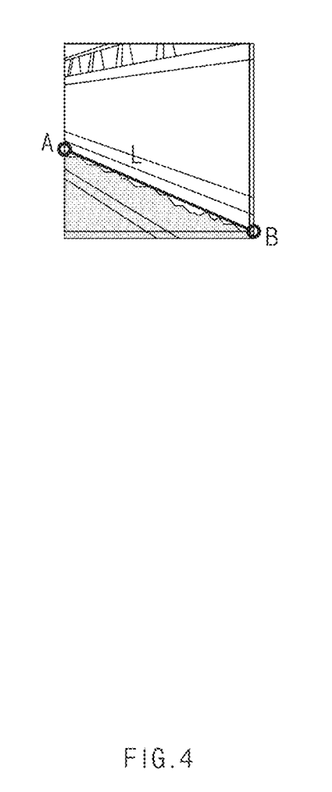
FIG. 4 is a view for describing a method for calculating a gradient for a boundary line according to embodiments of the present disclosure.

First, the side determiner 120 may approximate the (winding) boundary line detected within the box region as described above to a linear boundary line L through approximation as illustrated in FIG. 4, calculate a gradient for a straight line connecting end points A and B to each other (20) and compare the calculated gradient with a first threshold threshold_1 (21), in order to determine the side of the object. In the present disclosure, the gradient may be a relative gradient to a lower base of the box. The first threshold threshold_1 is a minimum gradient that may represent a level of the probability that the linear boundary line L will become a boundary of the side of the object. The first threshold threshold_1 may be a gradient for a straight line from one end of the linear boundary line L toward a vanishing point.

Figure 5:
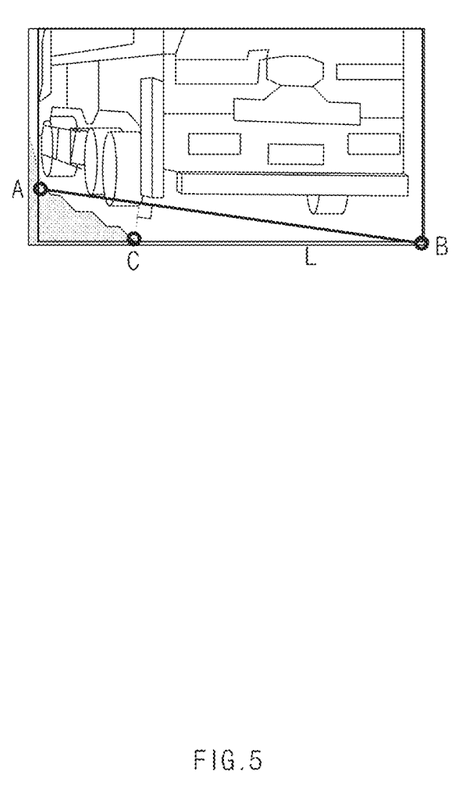
FIG. 5 is a view for describing a deviation between points on a boundary line and a linear boundary line L and a maximum deviation point C according to embodiments of the present disclosure.

Next, in the case in which the gradient is larger than the first threshold threshold_1 in 21, the side determiner 120 may calculate the respective distances (deviations) d from points on the (winding) boundary line detected with the box region as described above to the linear boundary line L (22), and compare a distance (a deviation) from a point C on the boundary line from which the distance d is maximum to the linear boundary line L with a second threshold threshold_2 (23), as illustrated in FIG. 5. The respective distances d may be calculated using a vertical distance formula between an equation of the linear boundary line L and any one point. The second threshold threshold_2 may be a value preset in order to determine whether or not the side and the rear of the object may be distinguished from each other, that is, a minimum distance between the point C on the boundary line and the linear boundary line L, and in the case in which the deviation as described above is smaller than the second threshold threshold_2, it may be decided that the entirety of the corresponding box region consists of only the side (without the rear) (29).

In the case in which the distance (the deviation) from the point C to the linear boundary line L is the second threshold threshold_2 or more, the side determiner 120 may decide that an obstacle (object) including both of the side and the rear is present in the box region, and further decide whether or not signs (positive (+) values or negative (−) values) of the deviations d from the points on the boundary line to the linear boundary line L are constant, thereby determining whether to classify the box region into the rear (24). That is, the points on the boundary line may have an error value. Therefore, in the case in which the signs of the deviations d are not constant, the decision of the side is impossible, and the box region is classified into the rear.

Figure 6:
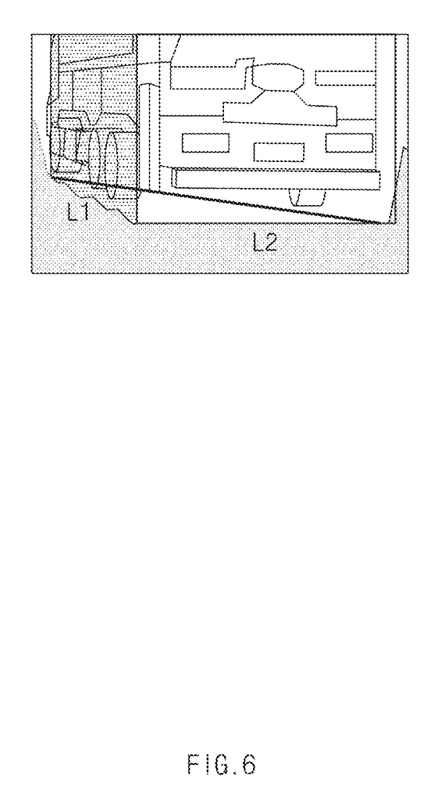
FIG. 6 is a view for describing a method for separating an obstacle box into a side and a rear at the maximum deviation point C according to embodiments of the present disclosure.

Meanwhile, in the case in which the signs (the positive (+) values or the negative (−) values) of the deviations d from the points on the boundary line to the linear boundary line L are constant, the side determiner 120 may separate the box region (separate the box region by a vertical line at the point C) into two left and right boxes including the respective linear boundary lines L1 and L2 from the point C toward both end points of the boundary line on the basis of the point C on the boundary line from which the distance d is maximum (25), as illustrated in FIG. 6.

Therefore, the side determiner 120 may calculate gradients of the respective linear boundary lines L1 and L2, that is, differences of coordinate values between the respective start points and end points (for example, differences of y-axis coordinate values when a lower base of the box is an x-axis and a side of the box is a y-axis) in the respective separated boxes (26), and compare the gradients of the respective linear boundary lines L1 and L2 with each other (27). Here, the corresponding separated box including the linear boundary line L1 having a larger gradient may be determined to be a box for the side (29), and the corresponding separated box including the linear boundary line L2 having a smaller gradient may be determined to be a box for the rear (28).

Figure 7:
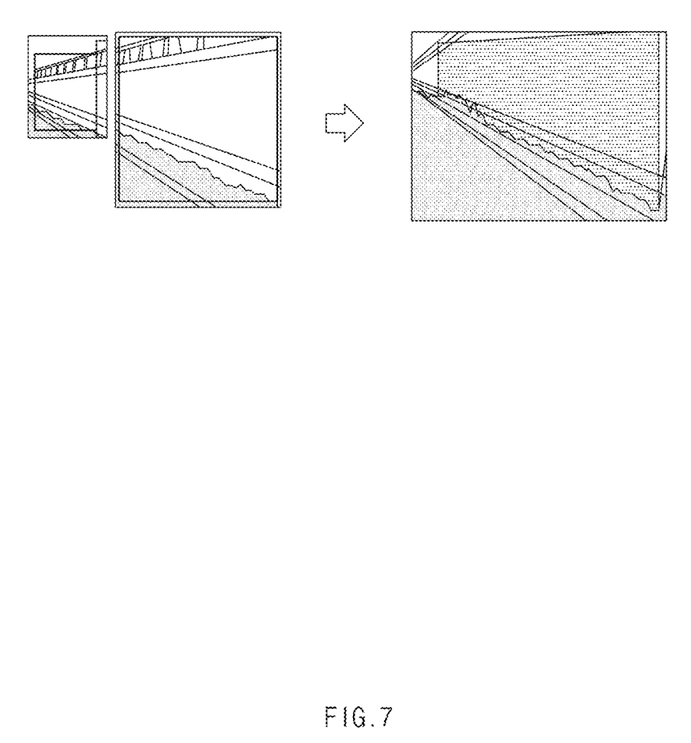
FIG. 7 is a view for describing a combination of obstacle boxes including a side according to embodiments of the present disclosure.

As described above, in the case in which the entire box region or the separated box region is determined to be a box region for the side depending on decision results of steps 23 and 27, the side combiner 130 may compare gradients of linear boundary lines within the corresponding box region and another obstacle box region determined previously to be a box region for the side in the image (gradients of boundary lines of the entire box region or the separated box regions) with each other (30). When a gradient difference is smaller than a third threshold threshold_3 (31), the side combiner 130 may decide that two boxes belong to a continuous plane of the same one object and combine images of the corresponding boxes with each other so that boundary lines are continuously connected to each other as illustrated in FIG. 7, thereby allowing images of the corresponding box regions to be put on the continuous plane of the same object (32). The third threshold threshold_3 may be a minimum gradient difference satisfied when two continuous boxes are present on a continuous plane of the same object.

Figure 8:
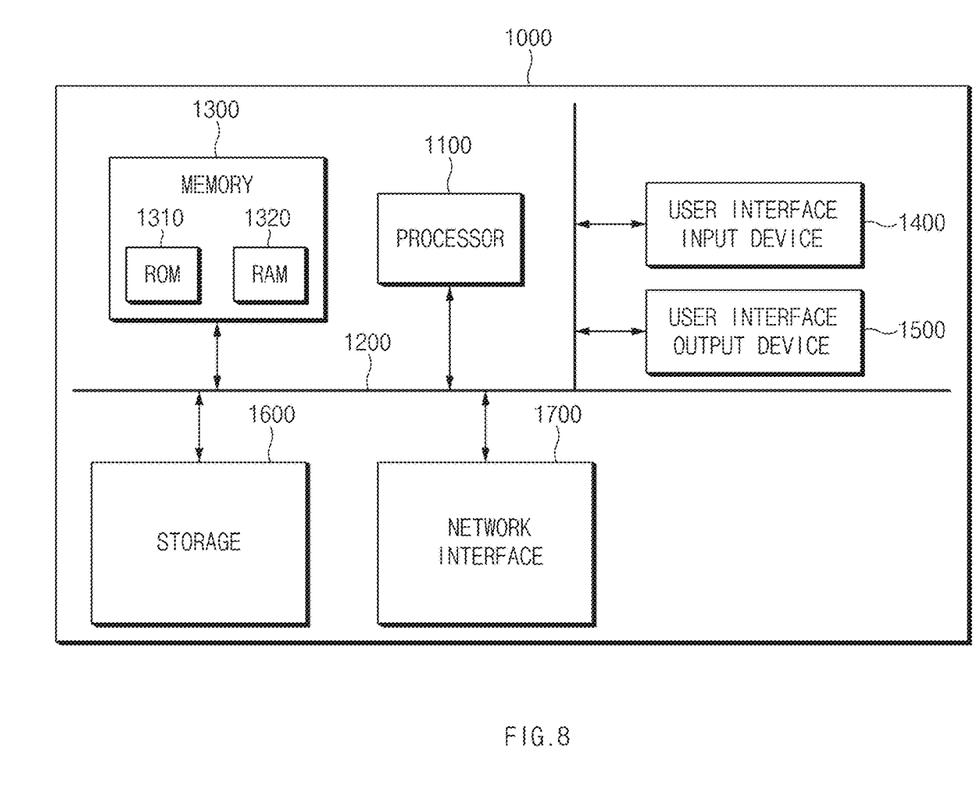
FIG. 8 is a view for describing an example of a method for implementing an apparatus for detecting an object according to an exemplary embodiment of the present disclosure.

FIG. 8 is a view for describing an example of a method for implementing the apparatus 100 for detecting an object according to an exemplary embodiment of the present disclosure. The apparatus 100 for detecting an object according to an exemplary embodiment of the present disclosure may be implemented by hardware, software, or a combination thereof. For example, the apparatus 100 for detecting an object may be implemented by a computing system 1000 as illustrated in FIG. 8.

The computing system 1000 may include at least one processor 1100, a memory 1300, a user interface input device 1400, a user interface output device 1500, a storage 1600 and a network interface 1700 connected to each other through buses 1200. The processor 1100 may be a semiconductor device executing processing for instructions stored in a central processing unit (CPU) or the memory 1300 and/or the storage 1600. The memory 1300 and the storage 1600 may include various kinds of volatile or non-volatile storage media. For example, the memory 1300 may be a read only memory (ROM) 1310 and a random access memory (RAM) 1320.

Therefore, steps of a method or an algorithm described in association with exemplary embodiments disclosed in the present disclosure may be directly implemented by a hardware or software module executed by the processor 1100, or a combination thereof. The software module may reside in a random access memory (RAM), a flash memory, a read only memory (ROM), an erasable programming ROM (EPROM), an electrically erasable programming ROM (EEPROM), a register, a hard disk, a detachable disk, a storage medium such as a compact disk-ROM (CD-ROM) (that is, the memory 1300 and/or the storage 1600). An illustrative storage medium may be coupled to the processor 1100, which may read information from the storage medium and write information to the storage medium. As another method, the storage medium and the processor 1100 may also be formed integrally with each other. The processor and the storage medium may also reside in an application specific integrated circuit (ASIC). The ASIC may also reside in a user terminal. As another method, the processor and the storage medium may also reside as individual components in the user terminal.

As described above, in the method and the apparatus 100 for detecting an object according to an exemplary embodiment of the present disclosure, it is possible to increase accuracy in detecting the object by division of a three-dimensional (3D) plane of an object and separation between a side and a rear of the object and to improve efficiency by a small amount of calculation by analyzing a ground boundary pattern of a detected object (obstacle) and detecting information on the side and utilizing characteristics of a 3D object projected on a two-dimensional (2D) plane without using other additional devices. In addition, since accurate information on detection target may be figured out through separation between the side and the rear of the detected object in the present disclosure, the present disclosure may be applied to a vehicle detector, or the like, thereby making it possible to easily detect a vehicle using the separated rear and accurately calculate a distance between an own vehicle and the target vehicle through calculation of a distance for the rear. In addition, a tracking target may be easily set and detected in an application for detecting other objects. In addition, since information on the side may be detected in the present disclosure, the present disclosure may be utilized for various application services. For example, since the wall is divided, a narrow pass may be recognized or a road structure such as a guardrail may be detected. Therefore, the present disclosure may be utilized for various services for safe driving, such as a collision alarm, or the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for detecting a side of an object in an apparatus for detecting a side of an object within an image, comprising:
   analyzing, by a processor, an input image to search a detection target region in which a target object is included;
   detecting, by the processor, a boundary line between the target object and a ground within the detection target region;
   calculating, by the processor, a gradient for the boundary line;
   analyzing, by the processor, an image within the detection target region on the basis of the gradient to determine that the entirety of the detection target region is a region for the side of the target object or to determine a separated region corresponding to the side of the target object in the detection target region; and
   combining, by the processor, images of detection target regions determined to be the region for the side of the target object with each other so that the detection target regions are put on a continuous plane of the same object.

2. The method for detecting a side of an object according to claim 1, wherein the method for detecting a side of an object detects the side of the target object having an influence on driving of a vehicle during the driving of the vehicle through the apparatus within the vehicle.

3. The method for detecting a side of an object according to claim 1, wherein when the gradient is larger than a first threshold and a distance at a point from which the distance to an approximated straight line is largest among points on the boundary line is smaller than a second threshold, it is determined that the entirety of the detection target region is the region for the side.

4. The method for detecting a side of an object according to claim 3, wherein the second threshold is a value preset in order to determine whether or not the side and a rear of the target objects are distinguished from each other.

5. The method for detecting a side of an object according to claim 1, further comprising:
deciding whether or not signs of distances from points on the boundary line to an approximated straight line are the same as each other in order to determine the separated region corresponding to the side of the target object;
separating the detection target region into left and right regions on the basis of a point from which the distance to the approximated straight line is largest among points on the boundary line when all of the signs are the same as each other; and
comparing gradients of the respective boundary lines between the target object and the ground with each other within the respective separated regions in which the detection target is separated and determining that a region having a larger gradient is a separated region corresponding to the side of the target object in the detection target region.

6. The method for detecting a side of an object according to claim 5, further comprising, after the comparing step, determining that a region having a smaller gradient is a separated region corresponding to a rear of the target object.

7. The method for detecting a side of an object according to claim 1, wherein gradients of corresponding boundary lines within the detection target regions determined to be the region for the side of the target object are compared with each other, and it is decided that the detection target regions belong to the continuous plane of the same object to combine the images of the detection target regions with each other, when a gradient difference is smaller than a predetermined threshold.

8. An apparatus for detecting a side of an object within an image, comprising a processor for:
analyzing an input image to search a detection target region in which a target object is included and for detecting a boundary line between the corresponding target object and a ground within the detection target region;
calculating a gradient for the boundary line and for analyzing an image within the detecting target region on the basis of the gradient to determine that the entirety of the detection target region is a region for the side of the target object or determine a separated region corresponding to the side of the target object in the detection target region; and
combining images of detection target regions determined to be the region for the side of the target object with each other so that the detection target regions are put on a continuous plane of the same object.

9. The apparatus for detecting a side of an object according to claim 8, wherein the apparatus for detecting a side of an object detects the side of the target object having an influence on driving of a vehicle during the driving of the vehicle through the apparatus within the vehicle.

10. The apparatus for detecting a side of an object according to claim 8, wherein the processor determines that the entirety of the detection target region is the region for the side when the gradient is larger than a first threshold and a distance at a point from which the distance to an approximated straight line is largest among points on the boundary line is smaller than a second threshold.

11. The apparatus for detecting a side of an object according to claim 10, wherein the second threshold is a value preset in order to determine whether or not the side and a rear of the target objects are distinguished from each other.

12. The apparatus for detecting a side of an object according to claim 8, wherein the processor:
decides whether or not signs of distances from points on the boundary line to an approximated straight line are the same as each other in order to determine the separated region corresponding to the side of the target object,
separates the detection target region into left and right regions on the basis of a point from which the distance to the approximated straight line is largest among points on the boundary line when all of the signs are the same as each other, and
compares gradients of the respective boundary lines between the corresponding target object and the ground with each other within the respective separated regions in which the detection target is separated and determines that a region having a larger gradient is the separated region corresponding to the side of the target object in the detection target region.

13. The apparatus for detecting a side of an object according to claim 12, wherein the processor determines that a region having a smaller gradient is a separated region corresponding to a rear of the target object after comparing the gradients with each other.

14. The apparatus for detecting a side of an object according to claim 8, wherein the processor compares gradients of corresponding boundary lines within the detection target regions determined to be the region for the side of the target object with each other, and decides that the detection target regions belong to the continuous plane of the same object to combine the images of the detection target regions with each other, when a gradient difference is smaller than a predetermined threshold.

* * * * *